United States Patent [19]

Rosa

[11] Patent Number: 5,297,891

[45] Date of Patent: Mar. 29, 1994

[54] CORNER CLIP FOR FRAME MEMBERS OF SCREEN DOORS AND THE LIKE

[75] Inventor: Jesus R. Rosa, Luguillo, P.R.

[73] Assignee: Commonwealth of Puerto Rico, San Juan, P.R.

[21] Appl. No.: 967,735

[22] Filed: Oct. 28, 1992

[51] Int. Cl.⁵ ............................................. F16B 12/50
[52] U.S. Cl. ..................................... 403/402; 49/501;
   49/504; 160/381
[58] Field of Search .................. 160/381; 49/504, 501;
   403/402, 401, 403

[56] References Cited

U.S. PATENT DOCUMENTS

| | | | |
|---|---|---|---|
| 1,336,193 | 4/1920 | Bryan | 403/402 |
| 2,621,764 | 12/1952 | Humphrey. | |
| 2,962,134 | 11/1960 | Lenhardt. | |
| 4,676,686 | 6/1987 | Eisenloffel | 403/402 |

Primary Examiner—Randolph A. Reese
Assistant Examiner—Christopher J. Novosad
Attorney, Agent, or Firm—Oblon, Spivak, McClelland, Maier & Neustadt

[57] ABSTRACT

A U-shaped corner clip for use with mitered corners of first and second hollow frame members. One leg of the clip has a hook to engage an opening in the outer edge of a first frame member. The other leg is insertable through an opening in the second frame member but has a length such that it passes from the interior of the second frame member into the interior of the first frame member and there resiliently bears on the inner face of the inner edge of the other frame member. Thus, any force tending to rotate the frame members apart in a direction to increase the angle therebetween is resisted by the action of the second leg member on the first frame member. The clip also resists any force tending to move the frame members linerally away from each other in any direction.

7 Claims, 3 Drawing Sheets

CORNER CLIP FOR FRAME MEMBERS OF SCREEN DOORS AND THE LIKE

FIELD OF THE INVENTION

This invention relates to corner clips for releasably locking together mitered corners of hollow frames, such as extruded aluminum frames for screen doors and the like.

BACKGROUND OF THE INVENTION

Clips for releasably connecting together the mitered corners of extruded metal frames for screen doors and the like are known but heretofore have usually comprised L-shaped members having hooks at the ends of the legs which snap into slots in the outer panels of the respective frame members. The clips are resilient and the angle between the legs is less than 90° whereby the legs must be spread apart and when snapped into the slots, the clips bias the miters towards each other but provide only slight resistance to movement of the miters away from each other. Thus after a period of prolonged use with the usual forces being exerted on the door as it is opened and closed, the clips loosen and the frame begins to rack so that it no longer fits properly within the door frame and may even collapse completely. A main object of the present invention is to provide a clip for frames of screen doors or the like whereby the frame is retained rigid throughout its life. Another object is to provide the combination of such a clip and a pair of frame members.

SUMMARY OF THE INVENTION

The clip of the invention comprises a U-shaped member of flat resilient strap material with the inner ends of the two leg parts being joined together by a straight intermediate part. The outer end of one of the leg parts is bent inwardly to form hook for engaging an opening in the outer edge panel of one frame member and the other leg part is insertable through a second opening in a second frame member. To this extent the clip of the invention is similar to the known L-shaped clips described above. However, the second leg part of the clip is made sufficiently long that when inserted through the second opening it extends from the interior of the second frame member into the interior of the first frame member where it bears resiliently on the inner face of the lower edge panel of the first frame member and it may also bear on the inner face of the lower edge panel of the second frame member. With this arrangement the frame members cannot be separated by a force on the frames in any direction.

The invention will be fully understood when the following detailed description is read in conjunction with the accompanying drawings wherein:

DETAILED DESCRIPTION OF THE INVENTION

Figure 1:
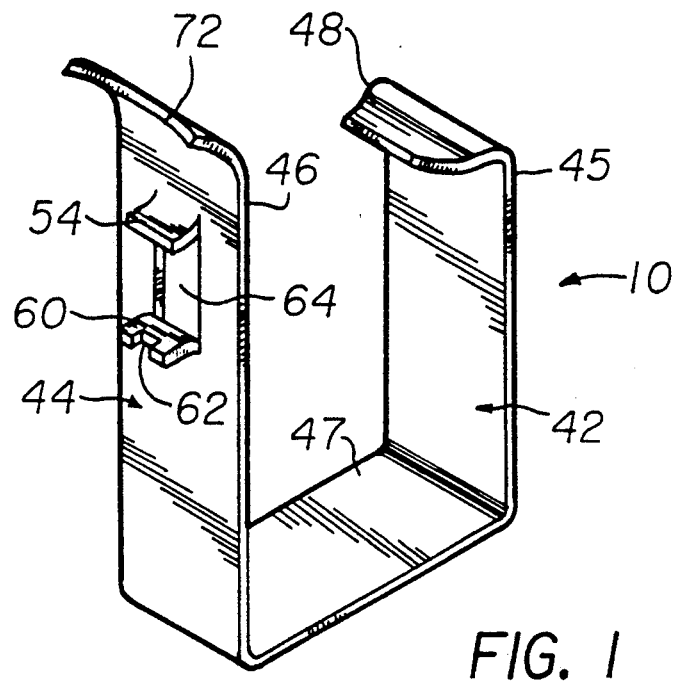
FIG. 1 is a perspective view of a corner clip constructed in accordance with the invention.
Figure 3:
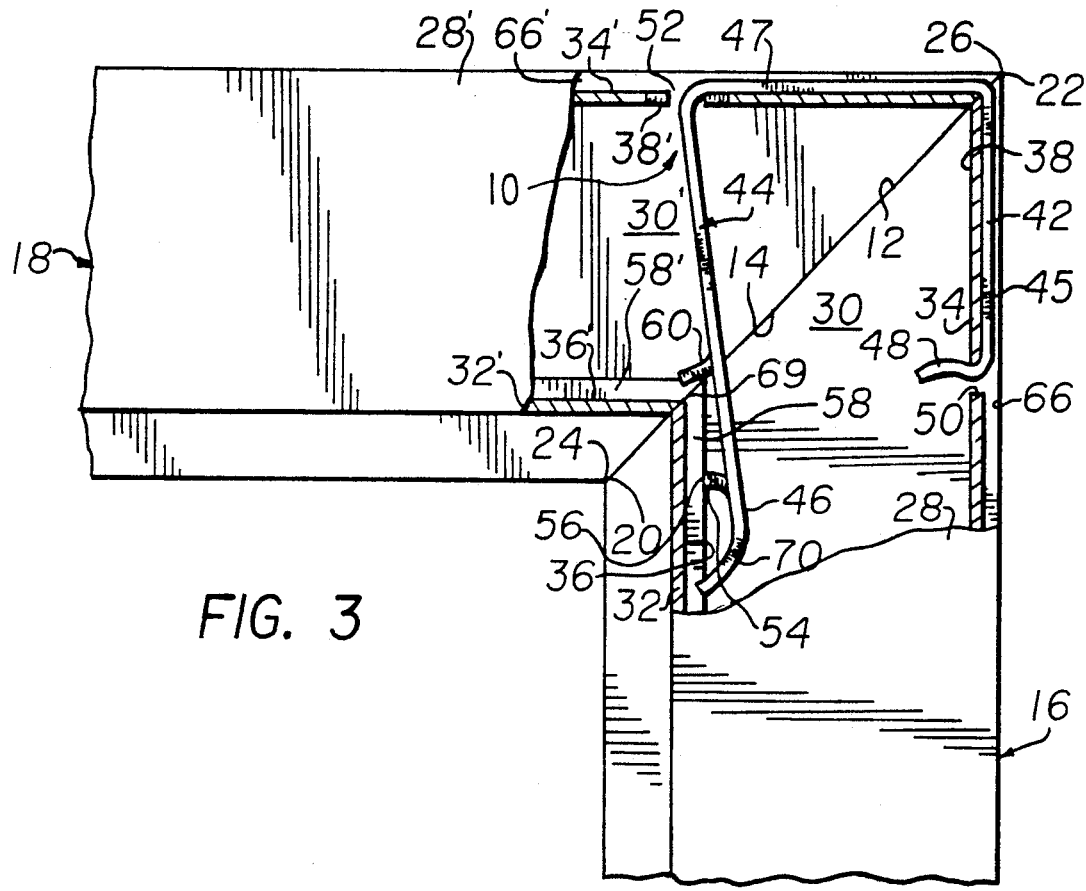
FIG. 3 is a broken side elevational view of two mitered frame members showing the manner in which the clip extends from the interior of the other and bears resiliently on the inner face of a lower edge panel of the other frame member.

Referring now to the drawings and particularly FIGS. 1 and 3 the numeral 10 designates a corner clip constructed in accordance with the invention. The clip is designed to releasably hook together the mitered corners 12, 14 of first and second frame members 16, 18. The mitered corner 12 has an inner end 20 and an outer end 22 and the corner 14 has an inner end 24 and an outer end 26.

Each of the frame members 16, 18 has a hollow interior which is rectangular in cross section and since the two frame members are identical except for clip receiving openings, later described in detail, the same reference characters apply to the structure of both frame members, with those of one frame member bearing prime signs. Each frame member 16, 18 comprises a pair of side panels 28, 30 and 28', 30, having inner faces spaced laterally apart a predetermined distance and joined together at their inner and outer edges by a pair of inner and outer edge panels 32, 34 and 32', 34' having inner faces 36, 38, and 36', 38', respectively, spaced vertically apart a predetermined distance.

With particular reference to FIG. 1, the clip 10 of the invention comprises a U-shaped member of resilient flat material, preferably springy metal, having a transverse width less than the transverse spacing between the inner faces of the frame member side panels 28, 30 and 28', 30, The clip 10 has first and second leg parts 42, 44 each having a free outer end 45, 46 and an inner end, the latter being integrally joined together by an intermediate part 47. The free outer end 45 of the first leg part 42 is bent to define an inwardly projecting hook 48 which, when the frame members 16, 18 and clip 40 are in the assembled condition of FIG. 3, is engageable in a first opening 50 in the outer edge panel 34 of the first frame member 16.

The second leg part 44 of the clip 10 is insertable into a second opening 52 through the outer edge panel 34' of the second frame member 18 and as best seen in FIG. 3, has a length substantially greater than the predetermined vertical spacing between the inner faces 36', 38' of the inner and outer edge panels 32', 34'. Thus, when the miters 12, 14 of the respective frame members 16, 18 are brought into abutting matching relationship as in FIG. 3, and the hook 48 of leg part 42 is inserted into the first opening 50 of the first frame member 16 and further the second leg part 44 of the clip is inserted into the second opening 52 of the second frame member 18, the free outer end 46 of the second leg part of the clip 10 extends from the interior of the second frame member 18 into the interior of the first frame member 16.

Figure 2:
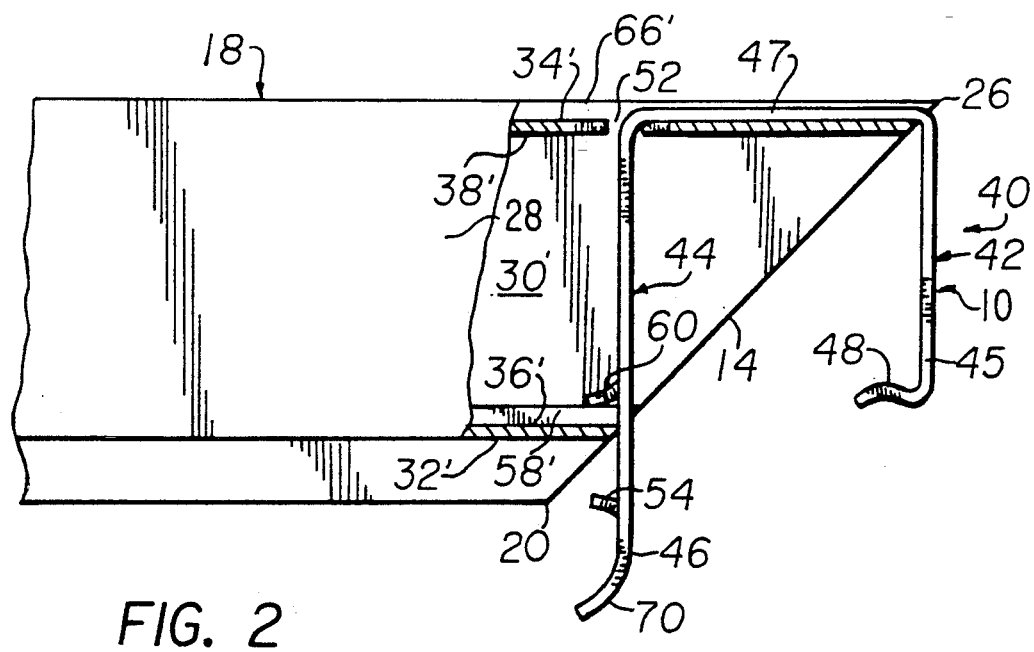
FIG. 2 is a broken side elevational view of one mitered frame member showing the clip as it appears when inserted into said one frame member.

By comparing the position of the second leg part 44 in its unflexed position of FIG. 2 with its position in FIG. 3, it will be observed that in the position of FIG. 3, leg part 44 is flexed and biased so that at least a portion thereof bears resiliently on a region 56 of the inner face 36 of the inner edge panel 32 of the first frame member 16. The portion of the second leg part 44 which bears resiliently on the region of the inner face as shown in FIG. 3 may comprise a tongue 54, as best seen in FIG. 1, which is struck outwardly from the plane of that part of the free end 46 of the leg part 44 which extends into the first frame member. The region 56 of the inner face part of the inner edge panel engaged by the struck-out portion or tongue 54 may be the outer edge of a ridge 58 normal to the plane of the inner faces 36 of the inner edge panel 32, an identical ridge 58' being located in the second frame member. Such ridges enclose inwardly opening slots (not shown) in the frame members which receive the edges of screening material in a well known manner.

As best seen in FIGS. 1, 2 and 3, a second projection or tongue 60 is struck outwardly from the second leg part 44 of the clip 40 and is so located that when the clip is in its position of use as seen in FIG. 3, the second tongue 60 bears on the edge of ridge 58' of the second frame member. To avoid an expensive tolerance problem, the outer end of the second tongue 60 is bifurcated at 62 as seen in FIG. 1 and the tongue tends to slide along the edge of the ridge 58, of the second frame member as the resiliency of the leg part 44 forces the projection or tongue 54 into engagement with a region of the edge of the ridge 58. Desirably, an opening 64 (FIG. 1) is formed in the leg part 44, the tongues 54 and 60 being struck outwardly from longitudinally spaced ends of the opening.

The invention has two aspects: the first being the corner clip, per se, and the second being the combination of the clip and the frame members with the clip attached thereto.

Figure 4:
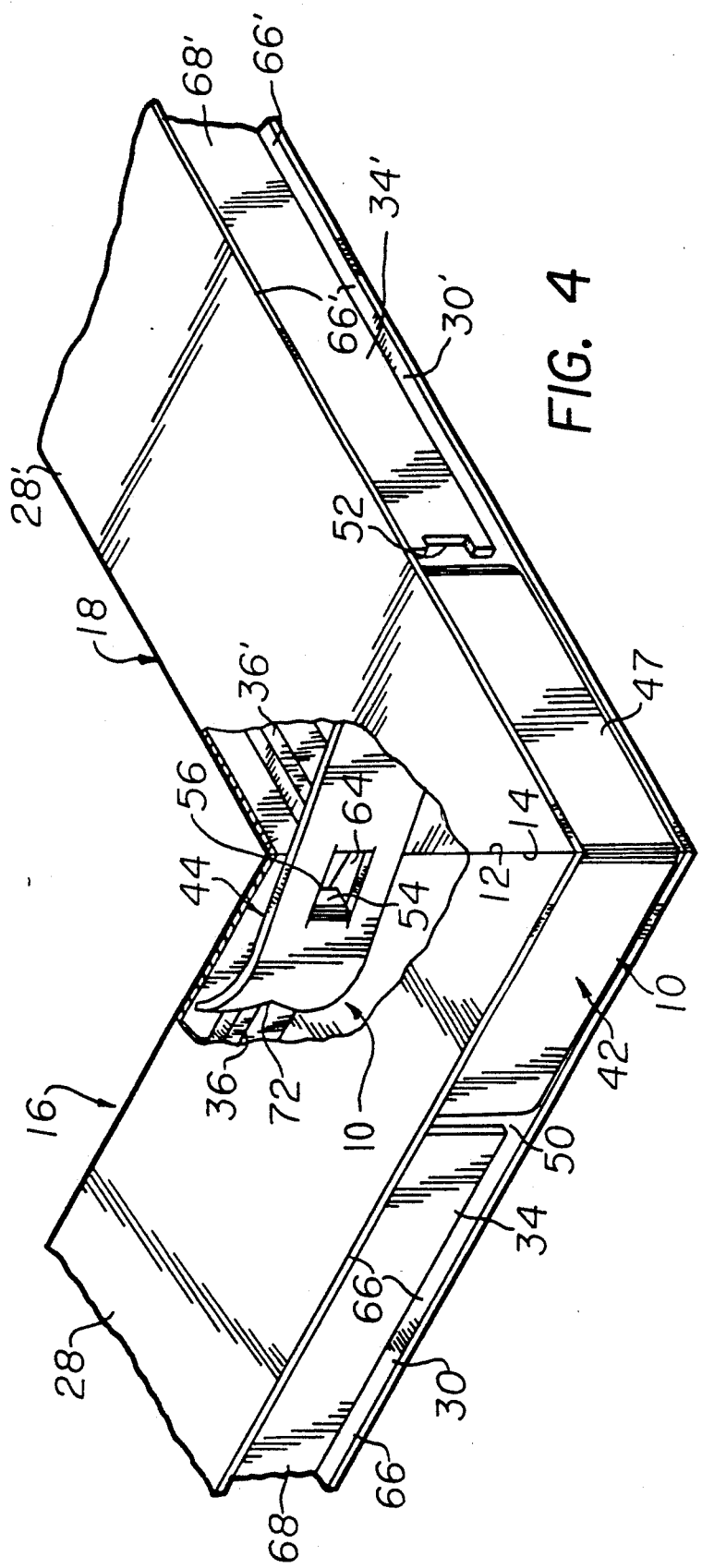
FIG. 4 is a broken perspective view showing the clip assembled to the two frame members.

Relative to the combination, the upper edges 66, 66' of the side panels 28, 30, and 28', 30' extend above the upper faces of the outer edge panels 34, 34' to define shallow channels 68, 68', as best seen in FIG. 4, the clip material having a thickness not in excess of the distance the upper edges 66, 66' of the side panels extend above the outer faces of the upper edge panels 34, 34'. Thus the clip in its position of use does not extend beyond the upper edges of the side panel as clearly seen in FIGS. 2, 3 and 4 and cannot interfere with the door frame, as well as being substantially obscured from view.

As best seen in FIGS. 2 and 3, the optimum location of the second opening 52 for the second leg part 44 of the clip is in the outer edge panel 34' of the second frame member in substantial alignment with the point of juncture 69 of the inner edge panels 32, 32'. With such an arrangement, the leg parts of the clip can be substantially parallel with each other and the second leg part can be moved straight into and in engagement with the first frame member with a minimum of manipulation.

As can be seen in FIGS. 1, 2 and 3, the extreme outer end of the second leg part is bent inwardly at 70 and has a swallowtail recess 72 as seen in FIGS. 1 and 4. This provides an alternative to the tongue 54 for resiliently engaging the inner face 3 of the lower edge panel 32 in the event the ridge 58 is lower than usual or non-existent so that the tongue 54 is unable to apply sufficient force to the lower edge panel for the purpose of the invention. The swallowtail recess 72 in the down turned end 70 permits the latter to straddle a shallow ridge. It will be apparent that the end 70 can also have a shape and dimension to engage the ridge 58 in lieu of the tongue 54. However, lengthening the bent portion 70 could impede assembly and, if it is too short, the second leg 44 could engage the juncture point of the ridges 58, 58' so that the part 70 could not exert a resisting force on the first frame member. The tongue 54 has been found to be optimum for this purpose with the downturned end 70 providing universality so that the clip is compatible with various configured frame members.

Figure 5:
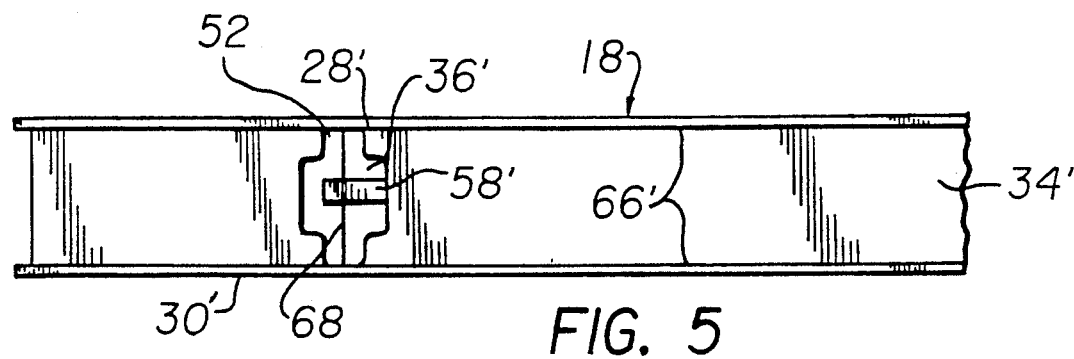
FIG. 5 is a horizontal plan view of one frame member looking at the upper face of the upper edge panel of said member and through the clip opening in that member.
Figure 6:
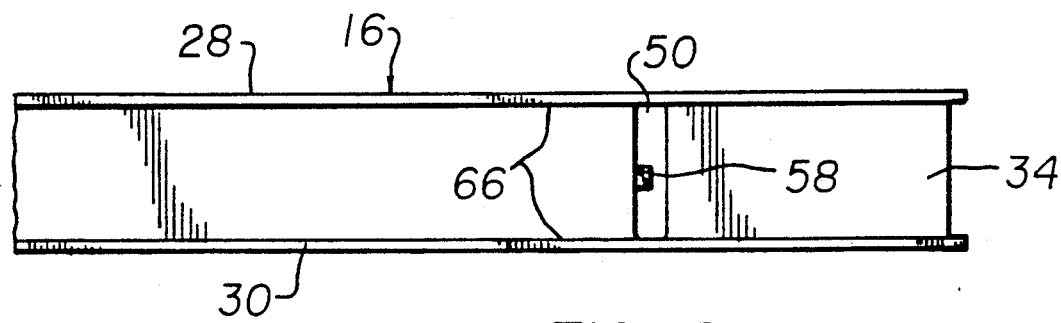
FIG. 6 is a similar view of the other frame member.

The use of the invention should be apparent from the foregoing description. First, the assembler moves the two miters 12, 14 together in matched relationship. He then inserts the second leg 44 of the clip 10 into its opening 52 which is of cruciform profile as best seen in FIG. 5 to accommodate the tongues 54, 60. The clip is rocked slight counter-clockwise in FIG. 2 to ensure that the end of the second leg is positioned properly in the first frame member. The assembler then pushes the intermediate part of the clip inward until it engages the outer face of the upper edge panel 34' of the second frame member at which point the hook 48 of the first leg part of the clip snaps into its opening 50 and the two frame members are rigidly connected together to resist any normal force applied to the frame members in any direction. The frame member can, however, be easily separated by merely inserting a tool, such as a screw driver, into the opening 50 to lift the hook 48 clear of the opening thereby permitting withdrawal of the clip clear of the frame members.

It will be apparent that the invention is susceptible of use with any type of hollow metal frame and is not necessarily restricted to use with screen door frames. Further, it will be apparent that the invention is susceptible of a variety of changes and modifications without, however, departing from the scope and spirit of the appended claims.

What is claimed is:

1. A corner clip for releasably hooking together mitered corners of first and second frame members, each having a hollow interior which is rectangular in cross section and including a pair of side panels having inner faces spaced laterally apart a predetermined distance and joined together at their inner and outer edges by a pair of inner and outer edge panels having inner faces spaced vertically apart a predetermined distance, said clip comprising a U-shaped member of resilient flat material having a transverse width less than the transverse spacing between the inner faces of said side panels, said clip having first and second leg parts each having a free outer end and an inner end, said inner ends being integrally joined together by an intermediate part, the free outer end of said first leg part being bent to define an inwardly projecting hook engageable in a first opening in the outer edge panel of said first frame member, said second leg part being insertable into a second opening through the outer edge panel of said second frame member and having a length substantially greater than said predetermined vertical spacing between said inner faces of said inner and outer edge panels so that when the miters of said frame members are brought into abutting matching relationship, said hook of said first leg part is inserted into said first opening and said second leg part is inserted into said second opening, the free outer end of said second leg part will extend from the interior of said second frame member into the interior of said first frame member, said second leg part being biased so that at least a portion thereof will bear resiliently on a region of the inner face of the inner edge panel of said first frame member.

2. The corner clip of claim 1 wherein said portion of said second leg part which will resiliently bear on a region of the inner face of said inner edge panel of said first frame member comprises a first projection struck outwardly from the plane of the extending free end of said second leg part.

3. The corner clip of claim 2 including a second projection struck outwardly from said second leg part and is located such that when said clip is in its position of use said second struck-out projection bears on an inner face part of the inner edge panel of said second frame member.

4. The corner clip of claim 3 wherein the inner face parts of said inner edge panels of the first and second frame members are the outer edges of ridges normal to the planes of the inner faces of said inner edge panels, said first and second projections being adapted to engage said outer edges of said ridges.

5. The corner clip of claim 3 including an opening formed in said second leg part of said clip, said first and second projections being struck outwardly from longitudinally spaced ends of said opening.

6. In combination, the corner clip of claim 1, connected to said first and second frame members.

7. The combination as claimed in claim 6, wherein said second opening is located along the length of said upper edge panel from the outer end of the miter of said second frame member so as to be in substantial alignment with the point of juncture of said inner edge panels when the miters of said frame members are in matched abutment with each other.

* * * * *